Aug. 22, 1933.  H. D. MOISE ET AL  1,923,224
LIQUID LEVEL GAUGE
Filed Dec. 27, 1924  2 Sheets-Sheet 1
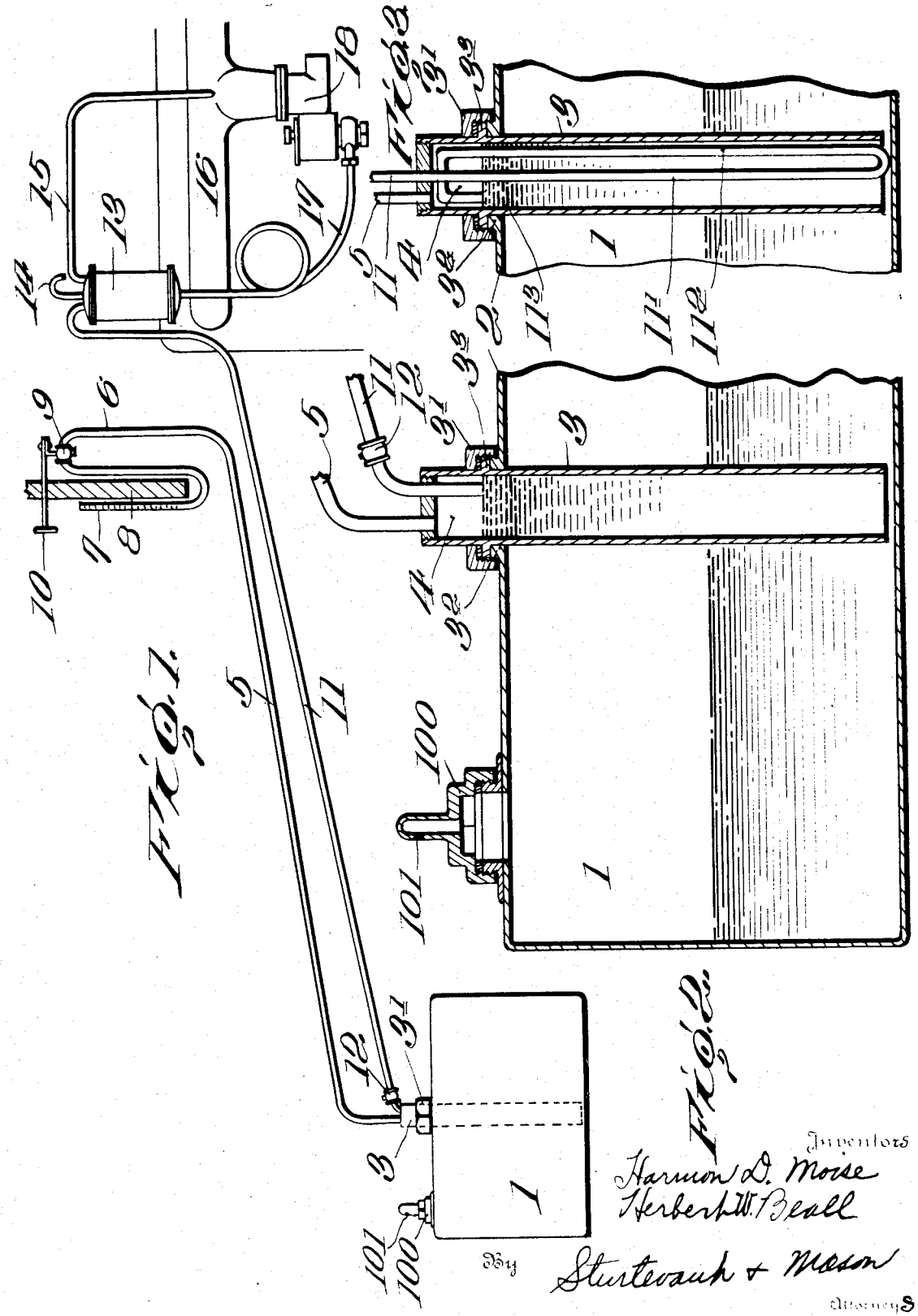

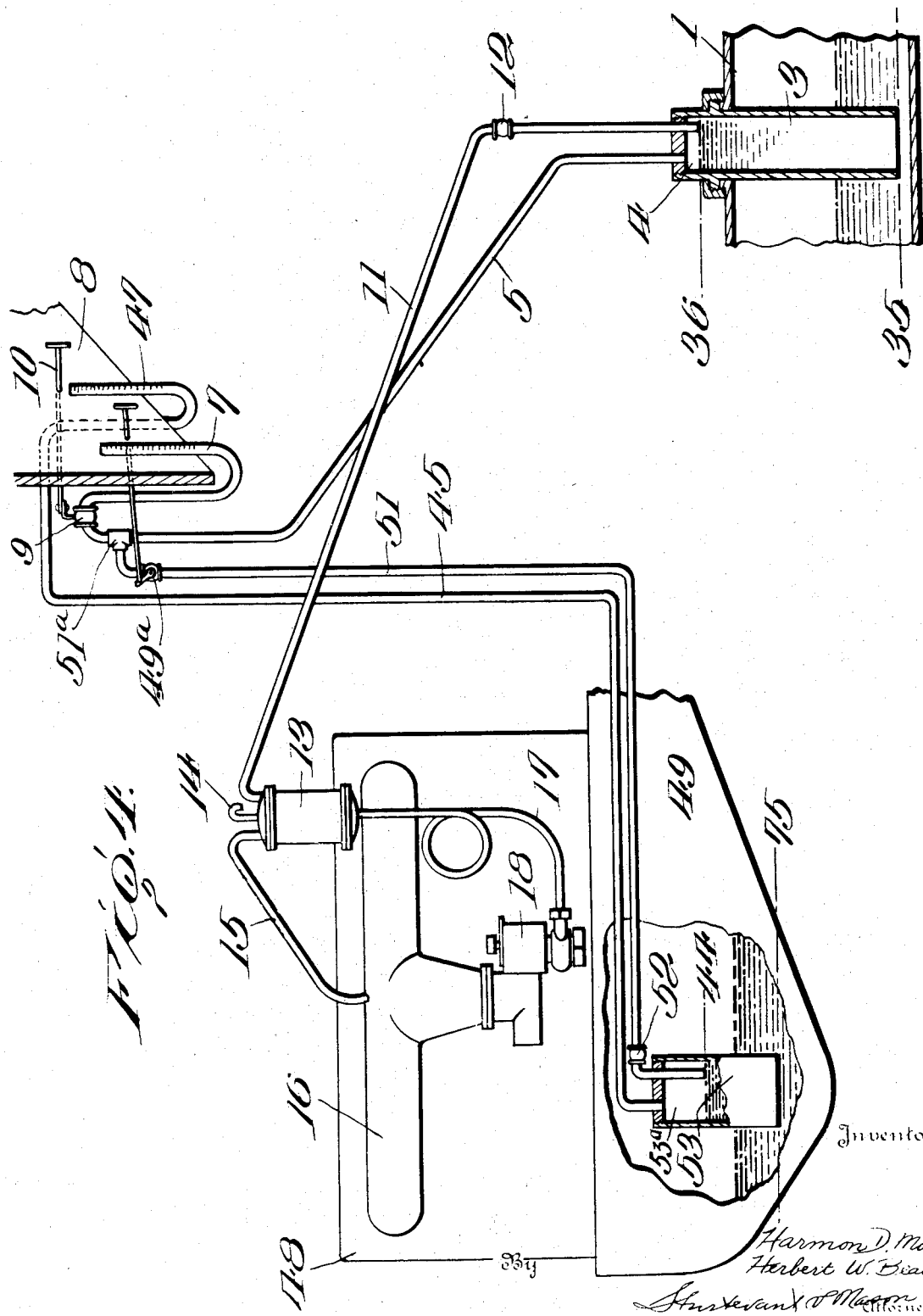

Patented Aug. 22, 1933

1,923,224

UNITED STATES PATENT OFFICE 1,923,224

LIQUID LEVEL GAUGE

Harmon D. Moise and Herbert W. Beall, Sumter, S. C., assignors to Vacuum Gauge Company, Sumter, S. C., a Corporation of South Carolina Application December 27, 1924
Serial No. 758,386

8 Claims. (Cl. 73—54)

Our invention relates to liquid level gauges.

The objects of the invention are to provide, for reservoirs from which liquid is lifted by suction of a pump, or a siphon or the like, a gauge to indicate the height of liquid in the reservoir, said gauge to be actuated by the degree of vacuum necessary to lift the liquid from its level in the reservoir to a given height, together with means to prevent the gauge from being affected in any manner by the motion of the liquid, and means to prevent air from being admitted to the gauge from the suction end, comprising either a check valve or a liquid seal, and also to provide means for introducing air to the gauge at will for the purpose of restoring atmospheric pressure to the apparatus. Also to provide a vacuum chamber in the reservoir with two distinct and separate tubes communicating therewith at different levels; the one having its intake end downward and being acted upon by suction and the other acting upon the gauge by communicating to it the degree of vacuum whereby the liquid in the reservoir is lifted from its level therein to the intake end of the suction or lifting tube or pipe. Also to provide the entire combustion above described with an air inlet valve to insure constant and accurate and repeated gauge readings to check the accuracy of any reading; also to provide a system in which both the gasoline and oil reservoir levels may be determined at the dash of motor vehicles by use of a vacuum apparatus. Also to provide a system in which the lack of certain predetermined quantities of two liquids in different reservoirs, either or both, will effect an automatic interruption of the functioning of the supply system.

These objects we accomplish by the construction shown in the accompanying drawings, in which—

Figure 1 shows the improved liquid level gauge in diagrammatic side elevation;

Fig. 2 is an enlarged sectional view of the main tank;

Fig. 3 is a similar view showing a modification, and

Fig. 4 is another modification in which the system has been applied to both the gasoline and oil reservoirs.

The gasoline tank 1 is arranged as usual at a lower level than the vacuum fuel feeding tank and is provided with a vertical tube 3 which at its lower open end extends down near to the bottom of said tank. The tube 3 is shown provided with an annular collar 3³ encircled by a screw ring 3' which engages a threaded collar 3² on the top of the tank 1. The upper closed end of the tube 3 extends above the top of the tank 1 and constitutes a vacuum chamber 4. From the upper end end of this chamber 4 extends the pipe 5 which leads to any suitable form of gauge of pressure responsive type so that it may be operated by the suction effect produced in the gauge pipe 5 during the operation as hereinafter described. The gauge shown consists of a U-shaped tube 6 forming an extension of pipe 5. The lower end of tube 6 extends upwardly as at 7, where the graduations will be visible at the dash 8. The tube 6 is provided at any suitable point with an air inlet valve 9, preferably provided with an operating handle 10 within reach of the operator it being shown as extending through the dash 8.

The suction pipe 11, in Fig. 2, extends down through the top of the vacuum chamber 4, to a point above the top of tank 1 and is provided just above the top of the chamber with a check valve 12, opening in the direction of the suction and closing reversely to prevent entrance of gasoline or air into the tank through the pipe 11. The opposite higher end of suction pipe 11, leads into the upper compartment of the usual gasoline vacuum tank 13 having the usual valve controlled air inlet pipe 14, pipe 15 connecting its upper end with the engine manifold 16 and a pipe 17 connecting its lower compartment as usual with a carburetor 18.

The tank 1 is provided with a filling cap 100 provided as usual with an air inlet 101.

When desirous of insuring accuracy of the reading on the gauge, the operator will temporarily open the air valve 9 to cause a falling of the gasoline in tube 3 from above the lower end of suction pipe 11. The engine suction will create a partial vacuum in pipe 11, thereby causing the gasoline to rise in the tube 3, and flow out through pipe 11, to the tank 13, whence it flows through pipe 17 to the carburetor. The suction through pipe 11 also creates a vacuum in chamber 4 sufficient to maintain the gasoline in tube 3 up to the lower end of pipe 11, and as this vacuum is in communication with the gauge 6—7, at the dash 8, the height of the gasoline in tank 1 will be indicated by the height of liquid in gauge tube 7. No gasoline will reach the lower end of pipe 5 which is separated therefrom by the height of the chamber 4. Entraining of air from pipe 5 by the jet action of the gasoline passing through the pipe 11, is thus entirely obviated and a correct gauge reading afforded. The check valve will effectually prevent admission of air into the chamber 4, and pipe 5, during the admission of air to the vacuum tank 13 through its pipe 14, during the interval when air enters through said air inlet 14, and so the liquid in the gauge will be unaffected. This object may also be accomplished as shown in Fig. 3, when the check valve 12 is omitted, and in lieu thereof, a liquid seal is provided. This is effected by extending the suction pipe 11 down to the lower end of tube 3, as at 11', and thence up into the upper end of the chamber 4 as at 11² and thence downwardly as at 11³ where its open end lies at about the level of the top of the tank in the same position as the lower end of pipe 11, in Fig. 2. This U-shaped bend in pipe 11 constitutes a liquid seal and serves the same purpose as check valve 12, both constructons constituting means for preventing air from passing from vacuum tank 13 and suction pipe 11, to the gauge and so insuring accurate readings at all times.

Referring now to Fig. 4, an apparatus is shown in which the delivery of liquid is automatically interrupted upon the failure of either of two reservoirs to contain a certain minimum supply. In the particular illustration is shown the application of the apparatus to the delivery of gasoline from a low-level tank to a high-level tank and thence to a carburetor; and the utilization of this carburetor to supply a gasoline engine having a lubricating oil reservoir in its crank case. The apparatus therefore will serve to indicate the respective liquid levels in the gasoline tank and in the oil reservoir: and in case of the lowering of either of such levels beyond a predetermined respective minimum, to effect the stopping of the engine.

The vacuum chamber 4 in the pipe 3 is made to project from the main tank 1, and the delivery pipe 11 is so disposed that the gasoline in tank 2 has to be raised a slight distance, say two inches, even when the tank is full. Otherwise, the pipes and other elements associated with the main gasoline tank 1 are arranged essentially as in Fig. 1, and have been given the same reference numerals. Their co-operation and function are similar to those already described.

A second suction pipe 51 has been branched from pipe 5 at the upper part 51ª of the gauge loop, at the dash board, and runs downward and is introduced into an oil standpipe 53, which has its open lower end submerged in the oil supply contained in the crankcase 49 of the internal combustion engine 48 to a depth such that it is sealed by such oil so long as a certain predetermined minimum level is maintained within the crankcase.

A pipe 45 leaves the closed upper end of the standpipe 53, and provides communication from this upper portion 53ª of the interior of this oil standpipe 53 with a second gauge 47 mounted on the dashboard or other readily visible portion of the vehicle. Standpipe 53 is so constructed that the distance between the maximum oil level and the upper vertical portion of pipe 51 is greater than the maximum lift in the gasoline tank. And the distance from level 44 to the normal minimum level of oil in the crankcase is less than the minimum lift of gasoline.

A check valve 52 may be and a shut-off valve 49ª is provided in pipe 51. The check valve 52, which is positioned above the maximum lift of the oil, will prevent the passage of air into the standpipe 53 from the pipe 51. The valve 49ª is for the purpose when closed of preventing the entrance of air into the pipe 5 when the oil has been lowered below the normal minimum level 75, thereby allowing a partial vacuum to be re-created in the vacuum chamber 4 and pipes 5 and 11; thus making it possible to operate the engine as lubricated by the reserve oil below the normal minimum level 75, for the purpose of going to a supply station to obtain a new supply of oil. Even during operation with the valve 49ª closed, the function of the gasoline gauge is preserved intact. When a replenishing supply of oil has been placed in the crank case, the valve 49ª should be opened in order to restore the functions of the oil system of the device.

In Fig. 4, the respective minimum gasoline and oil levels permissible have been indicated as 35 and 75.

The system as shown in Fig. 4, operates as follows:—When the engine commences to operate, a sub-atmospheric pressure is produced in vacuum feed tank 13 by suction. As is well known in the art, from time to time as the available fuel in this vacuum feed tank is delivered to the carburetor, the reduced pressure causes a suction of gasoline from the main tank 1 into the vacuum tank 13 through pipe 11. In the example shown, the first effect of the suction is to raise the gasoline in tank 1 up to the vacuum chamber 4 to the level 36, corresponding to the position of the lower end of pipe 11. Thereafter the suction draws gasoline from the interior of the pipe 3 and delivers it to vacuum tank 13. At all times, therefore, there is what may be denominated a "vacuum head" in the pipe 3 amounting to the distance from 36 to the prevailing gasoline level in main tank 1. This "head" causes a suction in gauge pipe 5, and causes the movement of a suitable indicating liquid in gauge 7 to indicate the corresponding prevailing gasoline level in main tank 1 as before.

At the same time, this sub-atmospheric pressure is communicated from pipe 5 through the oil-line suction pipe 51 to the oil standpipe 53. Into this pipe 53, the oil supply in the crankcase 49 is drawn, but oil can never be actually aspirated through pipe 51 into the gasoline gauge pipe 5, since the elevation of the branch connection between these pipes above the effective vacuum lift which can never be greater than the distance between the lines 35 and 36, no matter what the partial vacuum may be in the pipe 11, since any suction greater than this will merely serve to lift the liquid into the pipe 11; and by design, the vacuum required to lift oil from the maximum crank case oil level to the connection 51ª is much greater than that necessary to lift the liquid from the line 35 to the line 36.

The connection 51a is located above the maximum suction lift of liquid from the second standpipe in pipe 51: so that this pipe 51 can never deliver liquid from the second standpipe into pipe 5.

An oil gauge pipe 45 similar to gasoline gauge pipe 5 is connected to an oil gauge 47 corresponding to gasoline gauge 7; this oil gauge 47 varies to correspond to the "vacuum head" between oil level 44 and the prevailing oil level in the crankcase, and permits the chauffeur to determine the oil level from the dashboard gauge 47.

The partial vacuum created in the vacuum chamber 4 is extended into the pipes 5 and 51 and the gauge 7, and they are all caused to register a vacuum equal to the vacuum necessary in the vacuum chamber 4 to hold the liquid level in 3 up to the intake end of 11. This partial vacuum is sufficient, and not more than sufficient, to lift the liquid in the reservoir 1 at whatever level it may be up to the line 36.

Since 36 is always above the maximum liquid level in the tank 1, a partial vacuum will always be produced in these pipes, and the oil will be raised to some extent in standpipe 53 and the pipe 51. The height 36 of liquid above this maximum liquid level preferably represents a partial vacuum sufficient to raise oil in the crank case from a substantially minimum level to the outlet of the pipe 51. Any further raising of the oil by such partial vacuum will merely cause the oil to pass upward in the pipe 51; and the secondary partial vacuum in the upper portion 53ª of the standpipe 53 will represent a function of the difference in the respective heights of oil in the standpipe 53 and in the crankcase: this is transmitted to the gauge 47 and is independent of the partial vacuum in the pipe 51, although less than the latter.

So long as both the gasoline and oil are present in their respective reservoirs in quantity sufficient to exceed the prescribed minimum levels 35 and 75, the system continues to operate in this way.

As soon as the gasoline supply in main tank 1 has been reduced below the level of the low end of the tube of chamber 3, the air in the tank, as admitted through the closure 100 of Fig. 1, will enter the chamber 3, and thus prevent the delivery of gasoline through gasoline supply pipe 11, and the engine will thereafter cease to run when the remaining supply in the vacuum feed tank 13 has become exhausted.

As soon as the oil supply in the crankcase 49 has been reduced below the level 75, regardless of the quantity of gasoline in main tank 1, air will be admitted from the crankcase into the oil standpipe 53 under the bottom edge thereof and break the vacuum therein in the upper portion 53ª thereof. This air will then pass to pipes 51 and 5, and break the vacuum in the gasoline vacuum chamber 4; and the engine will thereafter cease to run when the gasoline supply in the vacuum feed tank 13 has become exhausted.

It will be seen that the engine is protected against injury by failure of lubricating oil.

It is obvious that the system is applicable to the interruption of the delivery of the contents of one liquid reservoir upon the consumption of the contents of another liquid reservoir, and as such will find many and varied application in the arts. It will be particularly understood that although a specific form of execution as applied to the gasoline and oil supplies of an internal combustion engine has been set forth, that it is in no wise applicable solely to such form, but that the parts, combinations and applications may be varied in anywise within the scope of the appended claims.

Having thus described the invention, what we claim as new and desire to secure by Letters Patent, is:—

1. In an apparatus of the character described, a first tank for liquid, a second tank for liquid, a first standpipe having a closed upper end located above the maximum liquid level in said first tank and having its lower end in communication with said tank at a predetermined liquid level therein, a first suction pipe communicating with said first standpipe at a point therein above the maximum liquid level in said first tank and including means to prevent air from passing therethrough in the direction opposite the flow induced by suction, means for creating a suction within said first suction pipe, a first pressure responsive gauge, a first gauge pipe for establishing communication between said gauge and the upper end of said first standpipe, a second standpipe having a closed upper end located above the maximum liquid level in said second tank at a distance greater than the suction lift produced in raising liquid from the bottom of said first standpipe to the intake end of said first suction pipe and having its lower end in communication with said second tank at a predetermined liquid level therein, a second pressure responsive gauge, a second gauge pipe for establishing communication between said second gauge and the upper end of said second standpipe, and a second suction pipe communicating at one end with said second standpipe at a point above the maximum liquid level in said second tank and with said first gauge pipe.

2. In an apparatus of the character described, a first tank for liquid, a second tank for liquid, a first standpipe having a closed upper end located above the maximum liquid level in said first tank and having its lower end in communication with said tank adjacent to the bottom thereof, a first suction pipe communicating with said first standpipe at a point therein above the maximum liquid level in said first tank and including a depending bend to prevent air from passing therethrough in the direction opposite the flow induced by suction, means for creating a suction within said first suction pipe, a first pressure responsive gauge, a first gauge pipe for establishing communication between said gauge and the upper end of said standpipe, a second standpipe having a closed upper end located above the maximum liquid level in said second tank and having its lower end in communication with said second tank at a predetermined liquid level therein, a second pressure responsive gauge, a second gauge pipe for establishing communication between said second gauge and the upper end of said second standpipe, said second standpipe and second gauge pipe providing a conduit extending higher than the distance of suction lift produced therein while raising liquid in said first standpipe and through said first suction pipe, and a second suction pipe for establishing communication between said second standpipe at a point above the maximum liquid level in said second tank and said first gauge pipe.

3. In a liquid level gauge, in combination with a liquid containing tank, a standpipe extending from near the top of said tank to the maximum depth to be indicated, a pressure responsive gauge, conduit means establishing communication between said gauge and the upper portion of said standpipe adjacent the top of the tank, a suction pipe having one end depending from and adjacent the top of said standpipe, with its opening facing downwardly; said end having an opening below the opening of the conduit means and means for creating a suction and connected to the other end of said suction pipe.

4. A device of the class described, in combination with a tank containing a liquid whose depth is to be measured, a liquid level gauge comprising a standpipe extending from near the top of the tank to the maximum depth to be indicated, a pressure responsive gauge, conduit means establishing communication between said gauge and the upper portion of said standpipe, a suction pipe having one end depending from adjacent the top of said standpipe, said end having an opening below the opening of said conduit means and facing downwardly, and means for creating a suction and connected to the other end of said suction pipe.

5. In an apparatus of the class described, in combination, a gasoline tank, an oil-containing engine crankcase, a first standpipe having a closed upper end located above the maximum liquid level in said gasoline tank and having its lower end in communication with said gasoline tank at a predetermined level therein, a first suction pipe communicating at one end with said first standpipe at a point therein above the maximum liquid level in said gasoline tank and including means for preventing air from passing therethrough in the direction opposite the flow induced by suction, a pressure conducting pipe communicating with the first standpipe above the point of communication of said first suction pipe with said first standpipe, a second standpipe having a closed upper end located above the maximum liquid level in said crankcase a distance greater than the maximum lift in said first standpipe, a second suction pipe communicating at one end with said second standpipe near the top thereof, the other end of said second suction pipe being connected to said pressure conducting pipe, valve means adapted to close said second suction pipe, and an engine operated fuel lifting device connected to the other end of said first suction pipe.

6. In a liquid level gauge, in combination with a liquid containing tank, a standpipe extending from near the top of said tank to the maximum depth to be indicated, a pressure responsive gauge, conduit means establishing communication between said gauge and the upper portion of said standpipe adjacent the top of the tank, a suction pipe having one end depending from and adjacent the top of said standpipe, with its opening facing downwardly; said end having an opening below the opening of the conduit means and means for creating a suction and connected to the other end of said suction pipe, said suction pipe being provided with check valve means to prevent the entry of air into the standpipe therethrough.

7. In an apparatus of the character described, a first tank for liquid, a second tank for liquid, a first standpipe having a closed upper end located above the maximum liquid level in said first tank and having its lower end in communication with said first tank at a predetermined liquid level therein, a first suction pipe communicating with said first standpipe at a point therein above maximum liquid level in said first tank with its opening facing downwardly, means for creating a suction within said first suction pipe, a first pressure responsive gauge, a first gauge pipe for establishing communication between said first gauge and the upper end of said first standpipe, a second standpipe having a closed upper end located above the maximum liquid level in said second tank a distance greater than the maximum lift in said first tank and having its lower end in communication with said second tank at a predetermined liquid level therein, a second pressure responsive gauge, a second gauge pipe for establishing communication between said second gauge and said second standpipe and extending therein to a point above the minimum liquid level in said second tank a distance less than the minimum lift in said first tank, a second suction pipe communicating at one end with said second standpipe at a point near the top thereof and with said first gauge pipe and including means to close said second suction pipe.

8. In an apparatus of the character described, a first tank for liquid, a second tank for liquid, a first standpipe having a closed upper end located above the maximum liquid level in said first tank and having its lower end in communication with said first tank at a predetermined liquid level therein, a first suction pipe communicating with said first standpipe at a point therein above the maximum liquid level in said first tank with its opening facing downwardly, means for creating a suction in said first suction pipe, a first pressure responsive gauge, a first gauge pipe, for establishing communication between said first gauge and the upper end of said first standpipe, said first gauge pipe including an air admitting valve, a second standpipe having a closed upper end located above the maximum liquid level in said second tank a distance greater than the maximum lift in said first tank and having its lower end in communication with said second tank at a predetermined liquid level therein, a second pressure responsive gauge, a second gauge pipe for establishing communication between said second gauge and said second standpipe and extending therein to a point above the minimum liquid level in said second tank a distance less than the minimum lift in said first tank, and a second suction pipe communicating at one end with said second standpipe at a point near the top thereof and with said first gauge pipe.

HARMON D. MOISE.
HERBERT W. BEALL.